US007809728B2

(12) United States Patent
Takahashi et al.

(10) Patent No.: US 7,809,728 B2
(45) Date of Patent: Oct. 5, 2010

(54) RECORDING/PLAYBACK APPARATUS AND METHOD

(75) Inventors: Kazuhiro Takahashi, Saitama-ken (JP); Toshimichi Kudo, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 11/059,083

(22) Filed: Feb. 15, 2005

(65) Prior Publication Data
US 2005/0147385 A1 Jul. 7, 2005

Related U.S. Application Data

(63) Continuation of application No. PCT/JP2004/009491, filed on Jun. 29, 2004.

(30) Foreign Application Priority Data

Jul. 9, 2003 (JP) ............................. 2003-194547

(51) Int. Cl.
*G06F 7/00* (2006.01)
*G06F 17/30* (2006.01)

(52) U.S. Cl. ...................................... 707/741; 707/915

(58) Field of Classification Search .................... 707/1, 707/2, 104.1, 705, 736, 741, 915
See application file for complete search history.

(56) References Cited

U.S. PATENT DOCUMENTS

| | | | | |
|---|---|---|---|---|
| 4,149,239 A | * | 4/1979 | Jenkins et al. | 711/108 |
| 4,553,206 A | * | 11/1985 | Smutek et al. | 707/101 |
| 4,907,283 A | | 3/1990 | Tanaka et al. | 382/40 |
| 5,485,611 A | * | 1/1996 | Astle | 707/1 |
| 5,740,445 A | | 4/1998 | Okuda | 395/707 |
| 5,883,804 A | * | 3/1999 | Christensen | 700/94 |
| 6,012,063 A | * | 1/2000 | Bodnar | 707/101 |
| 6,115,509 A | * | 9/2000 | Yeskel | 382/309 |
| 6,154,755 A | * | 11/2000 | Dellert et al. | 715/202 |
| 6,266,483 B1 | | 7/2001 | Okada et al. | 386/128 |
| 6,408,301 B1 | * | 6/2002 | Patton et al. | 707/102 |
| 6,526,009 B1 | * | 2/2003 | Van Gestel | 369/47.14 |
| 6,526,411 B1 | * | 2/2003 | Ward | 707/102 |
| 6,529,522 B1 | | 3/2003 | Ito et al. | 370/466 |
| 6,611,656 B2 | | 8/2003 | Okada et al. | 386/125 |
| 6,633,688 B1 | * | 10/2003 | Nixon et al. | 382/305 |
| 6,665,838 B1 | * | 12/2003 | Brown et al. | 715/205 |
| 7,103,740 B1 | * | 9/2006 | Colgrove et al. | 711/162 |
| 7,366,836 B1 | * | 4/2008 | Todd et al. | 711/114 |

(Continued)

FOREIGN PATENT DOCUMENTS

EP 0 487 331 5/1992

(Continued)

*Primary Examiner*—James Trujillo
*Assistant Examiner*—Marc Somers
(74) *Attorney, Agent, or Firm*—Fitzpatrick, Cella, Harper & Scinto

(57) ABSTRACT

A recording/playback apparatus records data and contents management information of the data on a randomly accessible recording medium, or plays back the data and contents management information from the recording medium. Upon changing the contents of group management information required to group arbitrary data independently of a file system, and management information, the contents of a playlist indicating a playback sequence of the data are changed. Upon creating a playlist, group management information corresponding to that playlist is automatically created, and a data list to be referred to by the playlist is updated.

5 Claims, 17 Drawing Sheets

U.S. PATENT DOCUMENTS

| | | | |
|---|---|---|---|
| 2002/0015252 A1* | 2/2002 | Noble et al. | 360/72.1 |
| 2002/0051641 A1 | 5/2002 | Nagaoka | 396/429 |
| 2002/0056025 A1* | 5/2002 | Qiu et al. | 711/133 |
| 2002/0147728 A1* | 10/2002 | Goodman et al. | 707/104.1 |
| 2003/0165329 A1 | 9/2003 | Okada et al. | 386/95 |
| 2003/0190151 A1 | 10/2003 | Okada et al. | 386/95 |
| 2003/0190152 A1 | 10/2003 | Okada et al. | 386/95 |
| 2003/0236850 A1* | 12/2003 | Kodama | 709/214 |
| 2004/0049489 A1 | 3/2004 | Yabe | 707/1 |
| 2004/0059822 A1* | 3/2004 | Jiang et al. | 709/230 |
| 2004/0189691 A1* | 9/2004 | Jojic et al. | 345/720 |
| 2004/0268068 A1* | 12/2004 | Curran et al. | 711/162 |
| 2005/0076008 A1 | 4/2005 | Kudou | 707/3 |
| 2006/0018629 A1* | 1/2006 | Lee | 386/69 |

FOREIGN PATENT DOCUMENTS

| | | |
|---|---|---|
| JP | 4-186447 | 7/1992 |
| JP | 2000-187963 | 7/2000 |
| JP | 2002-135692 | 5/2002 |
| JP | 2003-16764 | 1/2003 |
| JP | 2003-22655 | 1/2003 |
| JP | 2003-22656 | 1/2003 |
| JP | 2003-50816 | 2/2003 |
| JP | 2004-95004 | 3/2004 |
| WO | 03-014973 | 2/2003 |

* cited by examiner

FIG. 4

```
<par>
 <seq>
  <video src = "img0001.mpg"   dur = "1min"/>
 </seq>
 <seq>
  <video src = "../DCIM/100canon/img0001.jpg"   dur = "10sec"/>
 </seq>
 <seq>
  <video src = "img0007.txt   dur = "5sec"/>
 </seq>
        :
 <seq>
  <video src = "img0010.mpg   dur = "3min"/>
 </seq>
</par>
```

FIG. 9

| ATTRIBUTE | |
|---|---|
| MPEG1 | 0x01 |
| MPEG2 | 0x02 |
| MPEG4 | 0x03 |
| JPEG | 0x04 |
| MP2 | 0x10 |
| MP3 | 0x11 |
| AAC | 0x12 |
| PCM | 0x13 |
| BMP | 0x20 |
| TEXT | 0x30 |
| EFFECT | 0x40 |
| PlayList | 0x50 |
| GROUP FOLDER | 0x80 |
| RESERVED | 0x90 |
| RESERVED | 0xA0 |
| TIME MAP | 0xB0 |
| RESERVED | 0xC0 – 0xFE |
| EXTENDED | 0xFF |

FIG. 10

| | |
|---|---|
| ATTRIBUTE | ~1001 |
| INDEX NUMBER | ~1002 |
| INDEX NUMBER OF PARENT DIRECTORY | ~1003 |
| INDEX NUMBER OF THUMBNAIL | ~1004 |
| INDEX NUMBER OF CORRESPONDING PLF | ~1005 |
| FOLDER NAME | ~1006 |
| EXTENDED INDEX OF ADDITIONAL INFORMATION | ~1007 |
| NUMBER OF MEMBERS (N) | ~1008 |
| MEMBER 1 ( INDEX NUMBER ) | ~1009 |
| MEMBER 2 ( INDEX NUMBER ) | ~1010 |
| ⋮ | |
| MEMBER N ( INDEX NUMBER ) | ~1011 |

RECORDING/PLAYBACK APPARATUS AND METHOD

CLAIM OF PRIORITY

This application claims priority from Japanese Patent Application No. 2003-194547 filed on Jul. 9, 2003, which is hereby incorporated by reference.

TECHNICAL FIELD

The present invention relates to a recording/playback apparatus and method for managing a file and playback control information included in a recording medium.

BACKGROUND ART

Conventionally, when information such as moving image data, still image data, audio data, and the like included in a recording medium such as an optical disk, magnetic disk, magnetooptical disk, or the like is to be handled by an application such as image display software, digital album software, or the like, information on the recording medium (disk) is directly accessed via a file system such as UDF, FAT, or the like, as shown in FIG. 17.

In a print mode, list display mode, slideshow mode, or the like, in a case where a plurality of files must be grouped, a management file such as a playlist file, DPOF file, or the like, which describes files that belong to a group and required information, is generated for each group, and individual grouping files are managed by a corresponding management application.

In recent years, video cameras using a hard disk, magnetic disk, and the like as recording media have begun to be put into the market. Since such video camera using the recording medium can store respective scenes as files on the recording medium, respective scenes can be relatively easily and quickly accessed in a playback mode.

As a playback display method of the video camera that uses the recording medium, still image indices are recorded in files of respective scenes, and are displayed as a list. An image file selected from the list is displayed on a display device such as an LCD, EVF, or the like of a video camera main body, or is output as a moving image via a monitor output terminal. The volume of information recorded on a recording medium largely differs depending on the image quality and resolution upon recording. With the technical advances, the capacity of the recording medium is also increasing rapidly. For example, 12-Mbyte and 1-Gbyte products are available as card-like recording media, and a magnetooptical disk having a recording capacity of several ten Gbytes, and a hard disk having a recording capacity of several hundred Gbytes can be realized with low cost. For this reason, a recordable time and the number of files that can be recorded are increasing year by year.

Nowadays, the capacities of data recording media such as memory cards used in digital cameras, optical disks used in digital video cameras, and the like are increasing remarkably, and various data such as moving image data, audio data, still image data, and the like can be recorded. Also, many products using these recording media are available. In these products, an edit function of re-arranging or combining recorded contents by exploiting random access that cannot be attained by a video tape is one of the features of such product.

The edit function includes an erase function of erasing unnecessary contents, a partial erase function of designating and deleting an unnecessary part from contents, and functions of actually editing contents data (e.g., division and combination of contents). Also, a method of recording playback control information such as a playback sequence, layout, and the like, and reading out and playing back data according to this playback control information in a playback mode is known. Such method is an edit function called a playlist.

In order to implement this playlist, a method disclosed in Japanese Patent Laid-Open No. 2000-187963 may be used. With this method, data to be played back is designated by a pointer to a playback time map table. The playback time map table indicates the start position of each decode unit of MPEG (Moving Picture Experts Group). However, with this method, the description method of playback control information adopts a very limited format, and does not allow any flexible description. Also, only a compatible device or computer software can implement a playback process according to the playback control information.

When an application 1700 directly accesses files on a recording medium 1702 using a file system 1701 as in a conventional system shown in FIG. 17, if the number of files or the number of groups increases, it becomes difficult to simultaneously manage them, and it takes long time to retrieve necessary information. Furthermore, when a file is specified via a file system (a structure system including management information used to manage files and file data), the type of file can be determined based only on an extension, and video and audio files with the same type of extension can hardly be identified, thus disturbing quick search.

In order to time-serially play back a plurality of files recorded on the recording medium, all recorded files must be accessed to re-sort them in the order of their recording times. In this case, time-series information may be held by devising the directory structure or file names. However, the degree of freedom in the directory structure or file names lowers, resulting in inconvenience in terms of file management.

When the aforementioned management file is used, it must be created for each group. For this reason, in order to detect information such as members or the like included in each management file, management files must be opened and checked one by one, thus requiring troublesome, inconvenient processes. In addition, management files have different formats for respective applications that use them, and cannot be used by a different application, resulting in poor compatibility.

When each individual management file is used, access to respective files recorded on the recording medium is directly made by an application using the file system. Hence, a problem of the process that takes a long time to retrieve necessary information remains unsolved.

As for the playlist, upon displaying a reference designation file (contents) list which is referred to and designated by the playlist, or upon locking a reference designation file (contents) by a system, that playlist must be interpreted. Hence, an apparatus which does not have any playlist playback function cannot detect a reference designation file in a playlist created by another apparatus, and an appropriate warning message cannot be displayed when the user erases contents.

DISCLOSURE OF INVENTION

The present invention has been made in consideration of the conventional problems, and has as its feature to provide a recording/playback apparatus and method, which can describe a relationship among files and groups, can assure high compatibility among applications, and allow easy handling of files and group information in large quantities.

The data include moving image data, audio data, and still image data. Hence, the present invention can be effectively utilized in multimedia playback control.

The contents management information includes at least the file names of the data and data identification numbers unique to the data. In this manner, easy data management can be made since data are managed using the data identification numbers.

The data list is a data identification number group. Hence, easy data management can be made since data are managed using the data identification numbers.

The group management information includes group identification numbers unique to individual groups. Hence, easy data management can be made since groups are managed using the group identification numbers.

The group management information includes the group identification number of a parent group, i.e., can adopt a hierarchical structure. In this way, groups can have a hierarchical structure.

The group management information corresponding to playback control information includes predetermined, specific group management information as a parent group. In this manner, automatic grouping can be attained.

Also, representative images to be associated with the data and group management information are further stored. In this way, the data and groups can easily hold representative images.

A representative image to be associated with still image data is obtained by reducing that still image data to a predetermined size. In this way, the representative image of the still image data can be saved in a small data size.

A representative image to be associated with moving image data is obtained by reducing an arbitrary frame in the moving image data to a predetermined size. In this way, the representative image of the moving image data can be saved in a small data size.

The representative images are assigned unique management numbers. Hence, easy data management can be made since the representative images are managed using the management numbers.

The contents management information and group management information further describe the management numbers of representative images. In this way, the management numbers of representative images can be associated from the contents management information and group management information.

One or more representative images may be recorded together in a file. Hence, the representative images can be simultaneously managed.

Representative image management information used to manage the recording locations and recording data sizes of representative images corresponding to the management numbers of representative images is further stored. In this way, the attributes of representative images can be held.

Upon deleting data designated by a data list described in group management information corresponding to playback control information, a predetermined warning may be generated. In this way, data can be prevented from being inadvertently deleted.

Display means is further provided, and may be used to confirm execution of erase by predetermined display of the predetermined warning. In this way, data can be prevented from being inadvertently deleted.

A recording medium is detachable from an apparatus main body. Hence, a removable recording medium can be adopted.

The recording/playback apparatus of the present invention may be an image sensing apparatus which comprises means for inputting audio data, and image sensing means for inputting image data. In this way, the present invention can be applied not only to the recording/playback apparatus but also to a video camera or the like, which comprises the image sensing means for inputting image data.

Other features, objects and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 4 depicts a view showing a script example of a playlist in the embodiment of the present invention;

FIG. 9 depicts an explanatory view of a management file according to the embodiment of the present invention;

FIG. 10 depicts an explanatory view of a management file according to the embodiment of the present invention;

BEST MODE FOR CARRYING OUT THE INVENTION

Figure 2:
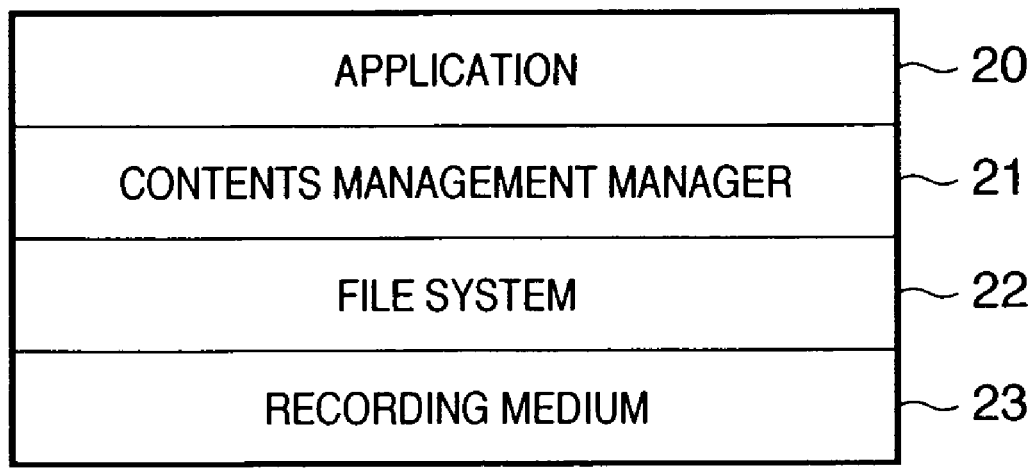
FIG. 2 depicts a view for explaining a management manager according to the embodiment of the present invention.

Preferred embodiments of the present invention will now be described in detail in accordance with the accompanying drawings. In this embodiment, a file system 22 that simultaneously manages all required files and groups, and a contents management manager 21 using that file system 22 are assured, as shown in FIG. 2. Hence, an application 20 can handle a large number of files on a recording medium 23 (disk) via the contents management manager 21 and can generally execute required processes such as grouping and the like without directly communicating with the file system 22.

First Embodiment

Figure 1:
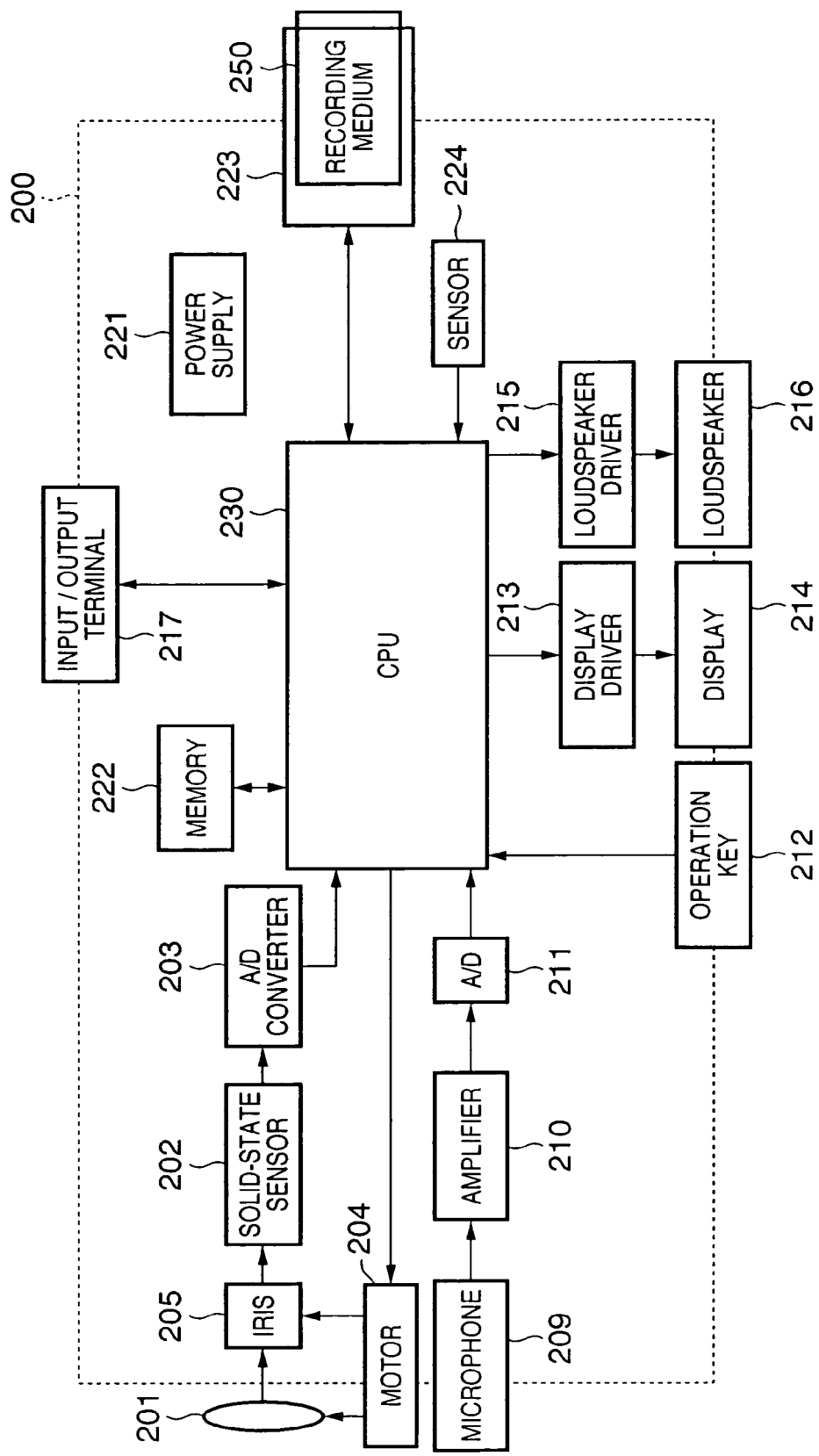
FIG. 1 is a block diagram showing the arrangement of an image sensing apparatus according to an embodiment of the present invention.

FIG. 1 is a block diagram showing the arrangement of an image sensing apparatus such as a digital camera, digital video camera, or the like according to the embodiment of the present invention.

Referring to FIG. 1, reference numeral 200 denotes the overall block of an image sensing apparatus. Reference numeral 201 denotes a lens used to capture a video; and numeral 202 denotes a solid-state sensor (CCD) for converting the video into an electrical signal. Reference numeral 203 denotes an A/D converter for converting the electrical signal output from the solid-state sensor 202 into digital data. Reference numeral 205 denotes an iris; and numeral 204 denotes a motor for driving the lens 201 and iris 205. Reference numeral 209 denotes a microphone used to capture an audio; and numeral 210 denotes a microphone amplifier for amplifying an audio signal from the microphone 209. Reference numeral 211 denotes an A/D converter for converting the audio signal into digital data. Reference numeral 212 denotes operation keys which are operated by the user and are used to control the operation of this image sensing apparatus 200. Reference numeral 213 denotes a display driver, which outputs a video signal sent from a CPU 230 as a display signal. Reference numeral 214 denotes a display such as a liquid crystal display (LCD), EVF, or the like, which displays a video. Reference numeral 215 denotes a loudspeaker driver used to output an audio; and numeral 216 denotes a loudspeaker. Reference numeral 217 denotes an input/output terminal which is connected to an external apparatus (not shown) and is used to input/output various kinds of information. Reference numeral 224 denotes various sensors. Reference numeral 250 denotes a recording medium; and numeral 223 denotes a socket for accommodating the recording medium 250. The CPU 230 controls the operation of this image sensing apparatus. Reference numeral 222 denotes a memory comprising a ROM area which records control programs and various data of the CPU 230, and a RAM area which is used as a work area for temporarily storing various data upon operation of the CPU 230. Reference numeral 221 denotes a power supply for the image sensing apparatus 200. As this power supply, electric power from a battery or AC adapter may be used.

The recording operation based on the aforementioned arrangement will be explained below. The solid-state sensor 202 converts a video sensed based on incoming light from an object via the lens 201 into an electrical signal. The A/D converter 203 samples this electrical signal and converts it into digital data. This digital data is input to the CPU 230 as a digital video signal including a luminance component Y and color difference components Cr and Cb or R, G, and B components. Upon photographing, the movement of the lens 201 is controlled by an auto-focus function and zoom function, and this control is executed by rotating the motor 204 according to a control command from the CPU 230. Upon sensing an image, a timing signal that makes the solid-state sensor 202 output an electrical signal is generated by the CPU 230. The iris 205 is controlled by rotating the motor 204 by the CPU 230. When the apparatus has an anti-vibration function implemented by the sensors 224 (acceleration sensor, anti-vibration actuator, and the like), the outputs from the acceleration sensor and anti-vibration actuator are input to the CPU 230, which outputs an anti-vibration control output signal based on these outputs. The motor 204 is driven based on this anti-vibration control output signal, thus attaining anti-vibration control by the anti-vibration actuator.

As for an audio, an audio signal captured via the microphone 209 is amplified by the microphone amplifier 210. The amplified signal is sampled by the A/D converter 211 to be converted into digital audio data, which is input to the CPU 230.

The digital video signal undergoes basic processes such as color separation, white balance, gamma correction, aperture correction, and the like, and also additional processes such as image size/image quality adjustment, position adjustment, and the like, which are set by the operation keys 212 of the image sensing apparatus 200. Furthermore, the digital video signal undergoes an image compression process such as MPEG, MJPEG, JPEG, JPEG2000, or the like on the basis of a set compression method and compression parameters, thus obtaining compressed image data. The digital audio data undergoes additional processes such as audio quality adjustment and the like, which are set by the operation keys 212 of the image sensing apparatus 200, and is compressed based on a set compression method and compression parameters to obtain compressed audio data. The compressed image and audio data form a data stream as a program stream or transport stream specified by MPEG together with control data.

Note that the aforementioned control data means information of the image sensing apparatus 200 itself, recording setting information of image data, audio data, and the like, and photographing additional information such as photographing environment information and the like. The recording data stream is written in a given directory (to be described later) of the recording medium 250 as a contents file under the management of a file system such as UDF, FAT, or the like.

This file system means a structure system which includes management information required to manage files, and file data. By commonizing this file system, different recording media or recording/playback apparatuses can perform recording/playback. The recording data is sent to the input/output terminal 217 as needed. Furthermore, the recording data is displayed on the display 214 via the display driver 213 for the purpose of confirmation. Electric power of this image sensing apparatus 200 is supplied from the power supply 221, and is supplied to respective circuit blocks.

Note that, as the recording medium 250, memory cards such as an MMC, SSFDC, SD, compact flash™, PC card, and the like, magnetic (or magnetooptical) recording media such as a hard disk, CD-RW, FD, MD, DVD-RAM, and the like, and so forth may be used.

In this embodiment, a disk-shaped magnetooptical disk is used as the recording medium.

Figure 16:
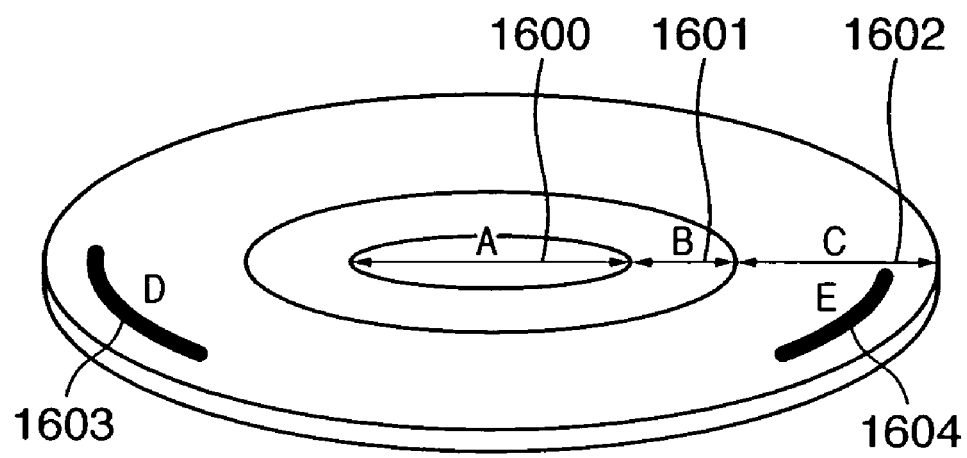
FIG. 16 depicts an explanatory view of a disk recording medium in the embodiment of the present invention.
Figure 17:
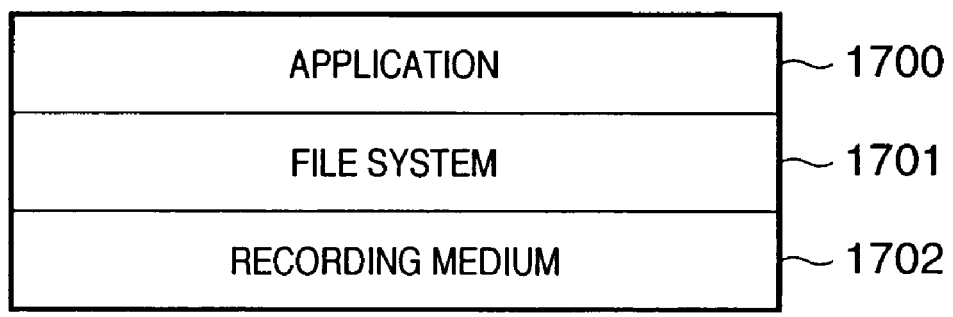
FIG. 17 depicts an explanatory view of the prior art.

FIG. 16 shows the outer appearance of the disk-shaped magnetooptical disk (recording medium 250) according to this embodiment. In this case, the recording data is recorded as digital data in a concentric pattern.

Referring to FIG. 16, reference numeral 1600 denotes an opening used upon chucking the disk during rotation. Reference numeral 1601 denotes a management area for recording data used to manage data written in the disk. Reference numeral 1602 denotes a data area in which actual recording data is written. Reference numerals 1603 and 1604 denote actually written recording data.

Figure 3:
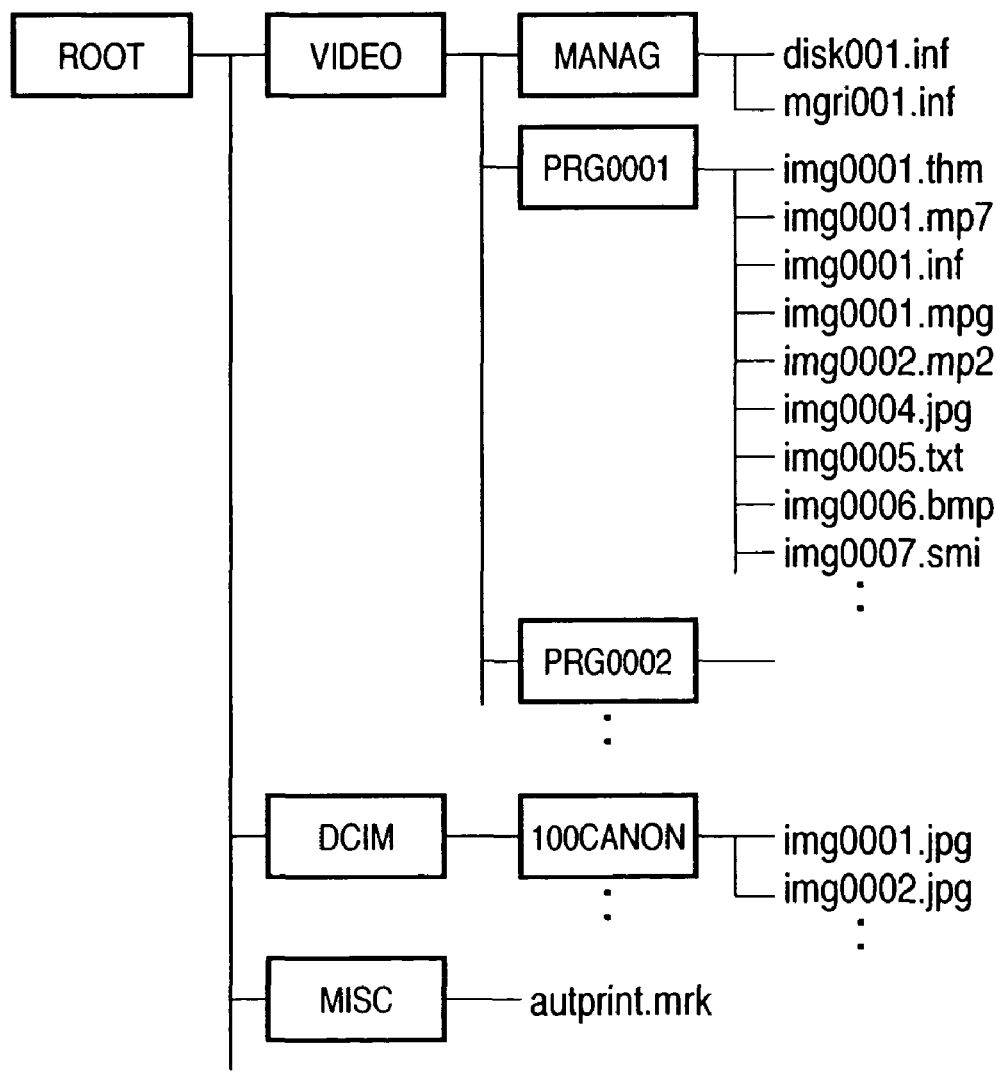
FIG. 3 depicts a view for explaining an example of a directory structure according to the embodiment of the present invention.

FIG. 3 depicts an example of the directory structure of files recorded on the recording medium 250.

Referring to FIG. 3, "VIDEO", "DCIM", and "MISC" directories are allocated under a "ROOT" directory, and an "MANAG" directory as a management directory is allocated under the "VIDEO" directory. A "disk001.inf" file that describes the attributes and the like of the recording medium 250, and a contents management file "mgri001.inf" used to simultaneously manage contents recorded on the recording medium (to be described later) are allocated under the "MANAG" directory. These two files are used to manage contents recorded on the recording medium 250. A contents file group, an "img0001.thm" file that records representative images of the contents group recorded on the recording medium 250 together, and an "img0001.mp7" file that records titles, a search table, additional information, and maintenance information of the contents group recorded on the recording medium 250 together are allocated under a "PRG0001" directory under the "VIDEO" directory. The search table recorded in this "img0001.mp7" is generated as a Hush table using the attributes, titles, dates, additional information, and the like as keys. As an example of contents files, an MPEG data file "img0001.mpg", an information file "img0001.inf" that describes the time stamp data and structure information of an MPEG data stream, an MPEG audio data file "img0002.mp2", a JPEG still image file "img0004.jpg", a text data file "img0005.txt", a bitmap image file "img0006.bmp", a playlist file "img0007.smi" that makes a scene description using the contents recorded on the recording medium 250 (to be described later), and the like are recorded.

When the number of contents files or the number (number "xxxx" of file name "imgxxxx") becomes equal to or larger than a predetermined value or when a predetermined condition is changed, a new directory (e.g., "PRG0002") is created under the "VIDEO" directory, and contents files are allocated under this directory in the same manner as the "PRG0001" directory. As a contents number, for example, when a recording contents file is an MPEG data stream, a number obtained by adding 1 to the previously used contents file number is used in a file name. For example, in case of FIG. 3, an MPEG data stream is recorded at an address \VIDEO\PRG0001\ to have a file name "img0008.mpg" that follows the file name "img0007.smi". In this case, an MPEG2 file is recorded together with a stream information file obtained upon creating that MPEG2 file as a file "img0008.inf". The "DCIM" directory specified by Digital Camera Format (DCF) and the "MISC" directory specified by Digital Print Order Format (DPOF) are assured under the "ROOT" directory, and contents specified by the corresponding standards can be allocated under these directories.

The generation and edit operations of a playlist will be explained below.

Note that the playlist is a list (file) that specifies the playback sequence, playback operation, playback environment, and the like of moving image data, still image data, text data, graphic data, effect data, additional information, and the like recorded on the recording medium 250.

In this embodiment, the playlist is expressed using the Synchronized Multimedia Integration Language (to be abbreviated as SMIL hereinafter). The SMIL description allows to (1) describe a temporal behavior of an expression;

(2) describe a layout position of an expression on the screen; and (3) associate a hyperlink with a multimedia object.

An example of a playlist based on the SMIL description, and the operation using the playlist will be explained below with reference to FIGS. 4 and 5.

FIG. 4 depicts an example of a list file based on the SMIL description, and expresses to sequentially play back contents described in <seq> tags in <par> tags. FIG. 4 shows a description example that sequentially plays back an MPEG file "img0001.mpg" for one min, a JPEG file "img0001.jpg" in a "100canon" directory under the "DCIM" directory for 10 sec, a text file "img0007.txt" for 5 sec, . . . , and finally an MPEG file 0010.mpg" for 3 min.

Figure 5:
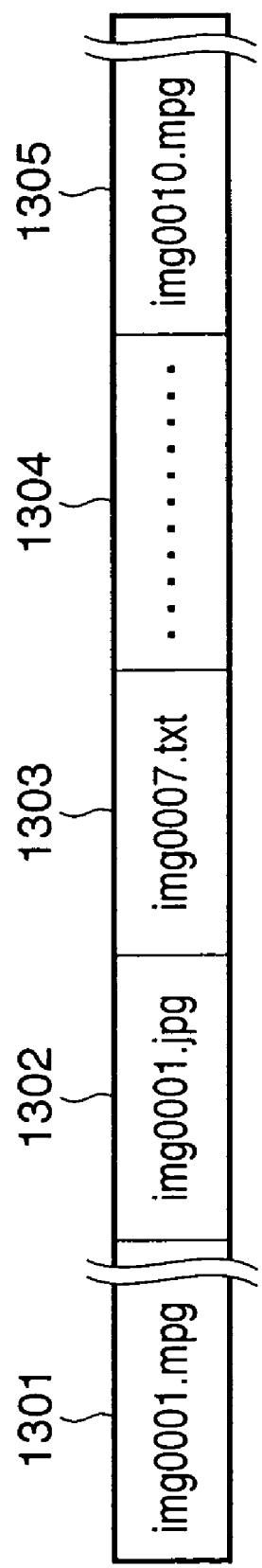
FIG. 5 depicts a schematic view for explaining a playback operation based on the playlist shown in FIG. 4 according to the embodiment of the present invention.

FIG. 5 shows an operation image of this description.

Referring to FIG. 5, reference numeral 1301 corresponds to a 1-min presentation of "img0001.mpg"; numeral 1302 denotes a 10-sec presentation of "img0001.jpg"; numeral 1303 denotes a 5-sec presentation of "img0007.txt"; numeral 1304 denotes a presentation of a middle part ( . . . part in FIG. 4); and numeral 1305 denotes a 3-min presentation of "img0010.mpg".

Creation of a new playlist will be explained below.

A new playlist is created when a playlist is automatically created by coupling scenes and is recorded on the recording medium 250 with a file name "img0001.smi" or the like in each recording operation of the image sensing apparatus 200, or when the operator creates a playlist at an arbitrary timing on the basis of respective photographing data, audio data, information, and effect information on the recording medium 250 as a playlist creation function of the image sensing apparatus 200, and so forth.

As practical creation methods, a method of creating a playlist based on the SMIL description on text level, a method of creating a playlist by preparing SMIL typical statements in advance, and selecting them by the operator, a method of creating a playlist by displaying recorded images, and making operations such as re-arrangement, cut, coupling, and the like of these images, and the like may be used.

As playlist edit methods, a method of directly editing an existing playlist described in SMIL on text level as a playlist edit function of the image sensing apparatus 200, a method of editing a playlist by displaying images to be played back according to that playlist, and making operations such as re-arrangement, cut, coupling, and the like of these images, and the like may be used. When information (image file) described in the playlist has been changed by a file erase operation, edit operation, or the like of the image sensing apparatus 200, the playlist must be automatically edited in correspondence with that change. Note that an automatic update process of a playlist may be inhibited by the function setups of the image sensing apparatus 200. When the automatic update process of a playlist is inhibited, no edit process of a playlist is made, or an edited playlist is saved as a playlist file with another name even when the playlist is edited (the original playlist contents are maintained).

Details of the contents management file "mgri001.inf" will be described below. As contents files to be managed by this "mgri001.inf", directories and a file group under the "VIDEO" directory in FIG. 3, or all directories and a file group under the "ROOT" directory on the recording medium 250, and links to contents files on the intranet or Internet other than the recording medium may be managed. Assume that the directories and files under the "ROOT" directly are to be managed in this embodiment.

Figure 7:
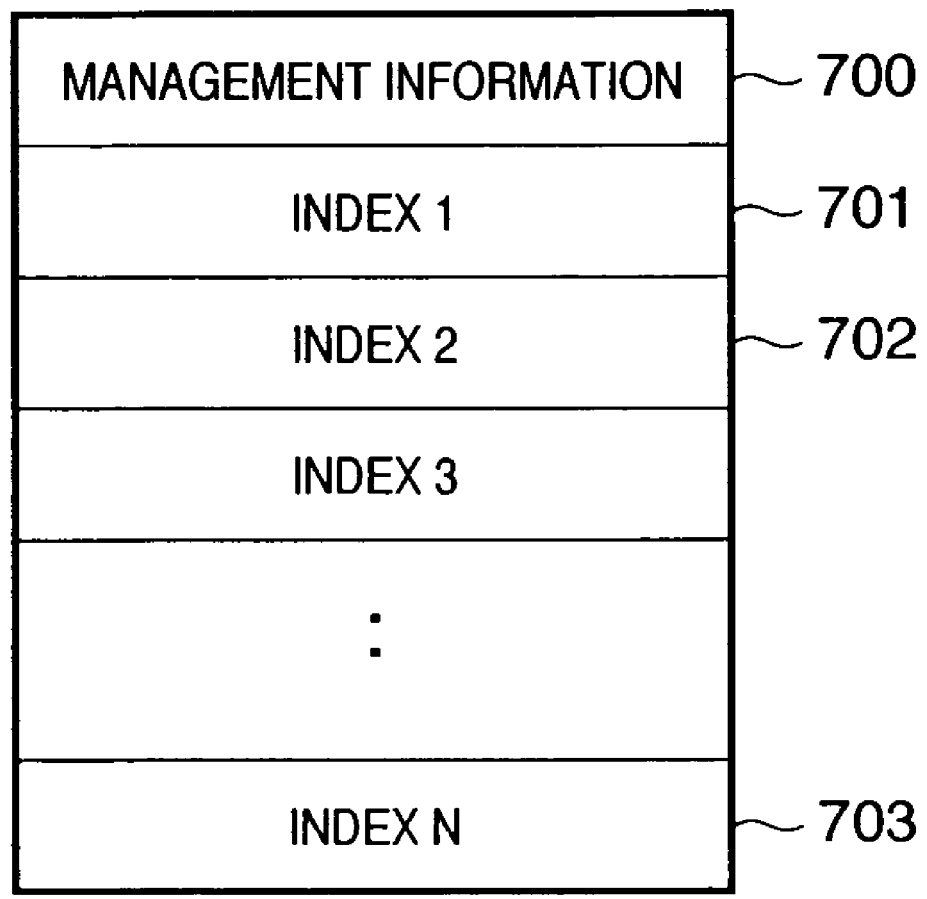
FIG. 7 depicts an explanatory view of a management file according to the embodiment of the present invention.

FIG. 7 depicts a view for explaining the basic configuration of the contents management file "mgri001.inf" according to this embodiment.

This file records, as "management information" 700, additional information such as an identifier, standard version, compatibility level, recording medium unique number, file size, the number of indices, date information (creation, update, access, and the like), creator, text information, and the like, at the head of the file. After such additional information, the file records index information blocks like "index 1" 701, "index 2" 702, . . . , "index N" 703.

Figure 8:
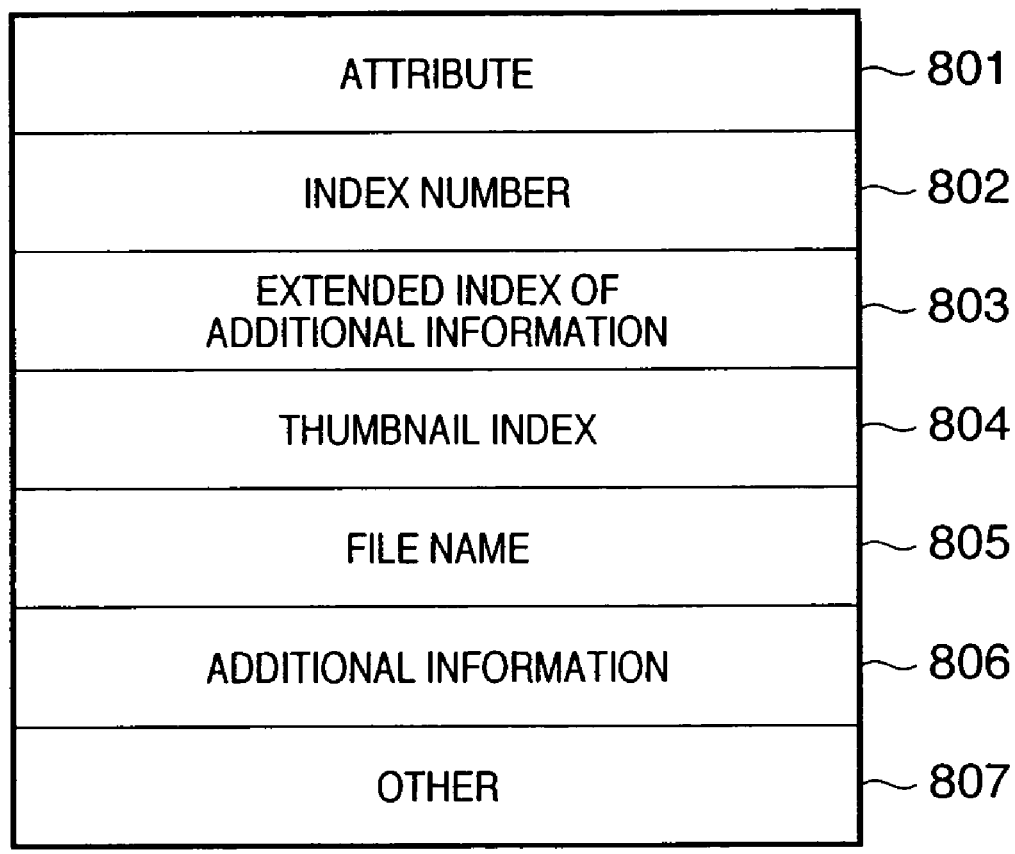
FIG. 8 depicts an explanatory view of a management file according to the embodiment of the present invention.

FIG. 8 depicts a view for explaining the contents of each index information block shown in FIG. 7.

The index information block describes information such as "attribute" 801, "index number" 802, "extended index of additional information" 803, "thumbnail index" 804, "file name" 805, "additional information" 806 of this contents, and "other" 807.

As an example of the "attribute" 801, as shown in FIG. 9, MPEG1 is defined by "0x01", MPEG2 by "0x02", MPEG4 by "0x03", . . . , PlayList by "0x50", "group folder" (to be described later) by "0x80", and a "time map" information file by "0xB0". Also, "0x90", "0xA0", and "0xC0" to "0xFE" are reserved. Furthermore, "0×FF" is defined as an extended attribute unique to a manufacturer.

As for a file name, when identical file names are used in different directories, each file name must be described using a full-path name. However, in this case, complicated management is required. For this reason, an attribute is added to a file name to facilitate management. For example, a file name is expressed by, e.g., "imageXXXXxxxx", in which "imageXXXX" indicates a serial number name, and "xxxx" indicates an attribute: "0x00" indicates the "VIDEO" directory; "0x01", the "DCF" directory; and "0x80", an "outside apparatus" directory.

FIG. 10 depicts a view for explaining the index structure of the attribute "group folder" shown in FIG. 9. This group folder is used to simultaneously manage required files and a group of the files.

The group folder describes "attribute" 1001, "index number" 1002, "index number of parent directory" 1003, "index number of thumbnail" 1004, "index number of corresponding PLF" 1005, "folder name" 1006, "extended index of additional information" 1007, "the number of members (N) 1008 registered in that index, index number of "member 1" 1009, index number of "member 2" 1010, . . . , index number of "member N" 1011. Note that when the number of members 1008 assumes a special numerical value such as "0xFFFF" or the like, it indicates a non-lowermost directory.

Each index may have either a fixed or variable length. In case of the variable length, size information is added to each index. Since the fixed or variable length size is set to be N multiples of a sector or cluster size of the file system, easy file access is allowed.

Figure 6:
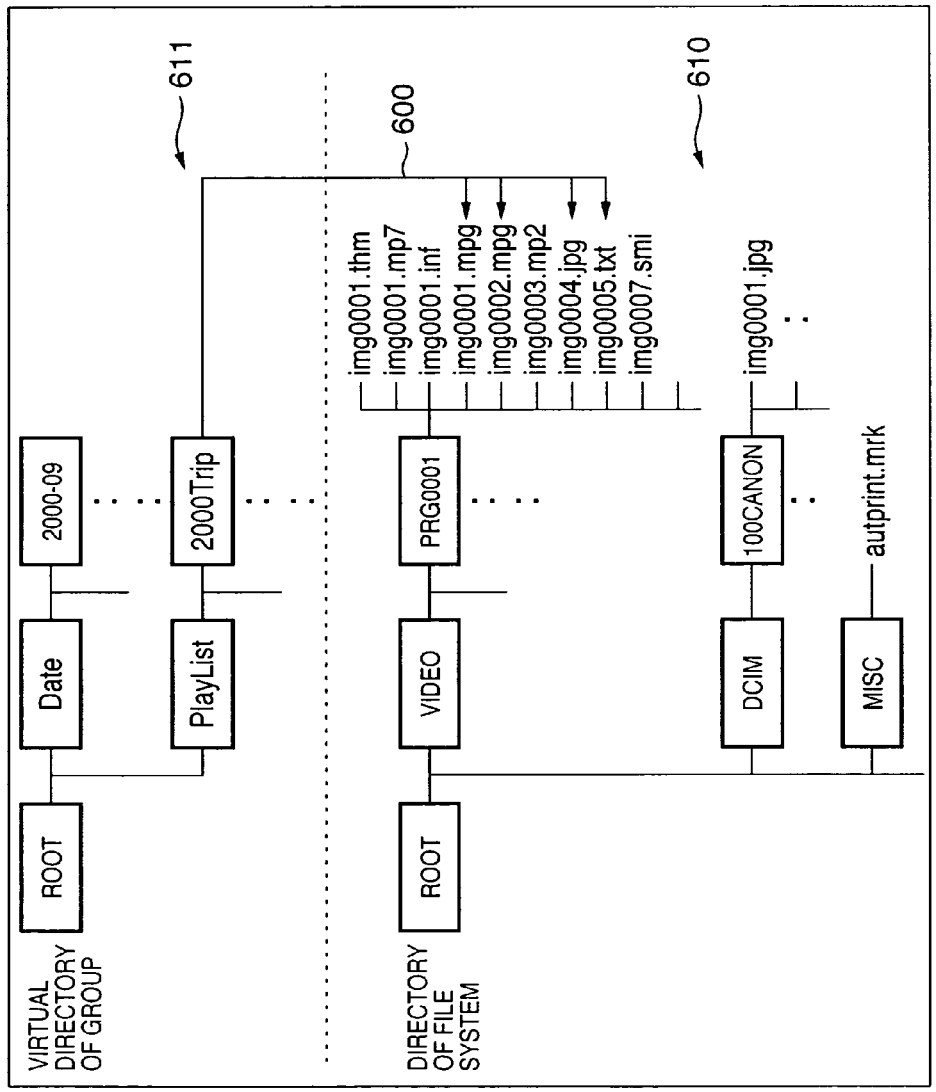
FIG. 6 depicts a view showing an example of a directory structure according to the embodiment of the present invention.

FIG. 6 depicts a view for explaining the relationship among the directories of the file system and virtual directories of a group in this embodiment. In FIG. 6, a lower portion 610 indicates the directories of the file system shown in FIG. 3, and an upper portion 611 indicates the virtual directories of a group.

The image sensing apparatus 200 according to this embodiment manages the entities of contents files by the file system, as indicated by 610, and manages a contents file group by directory management of the file system shown in FIG. 6. Each contents file is registered in the contents management file "mgri001.inf" shown in FIG. 7 with the basic index structure shown in FIG. 8.

The virtual directories of the group indicated by 611 are created as hierarchical directories using the index of the group folder shown in FIG. 10. The apparatus or operator selects some contents files of the contents file group of the file system as an arbitrary group, and saves its index number in the lowermost directory. For example, a directory "Playlist" is created under a virtual directory "ROOT", and a directory "2000Trip" is created under the directory "Playlist", as shown in FIG. 6. Furthermore, "img0001.mpg", "img0002.mpg", "img0004.jpg", and "img0005.txt" are registered in this directory "2000Trip" as members using their index numbers. In this example, the entity of the directory "2000Trip" is an SMIL file "img0007.smi" in the directory "PRG0001" of the file system, which is referred to by the index number 1002 of the group index of the directory "2000Trip". Such relationship is indicated by solid arrows 600.

A plurality of layers of virtual directories of the group folder may be prepared. By contrast, the number of layers may be limited to avoid complicated control.

Figure 11:
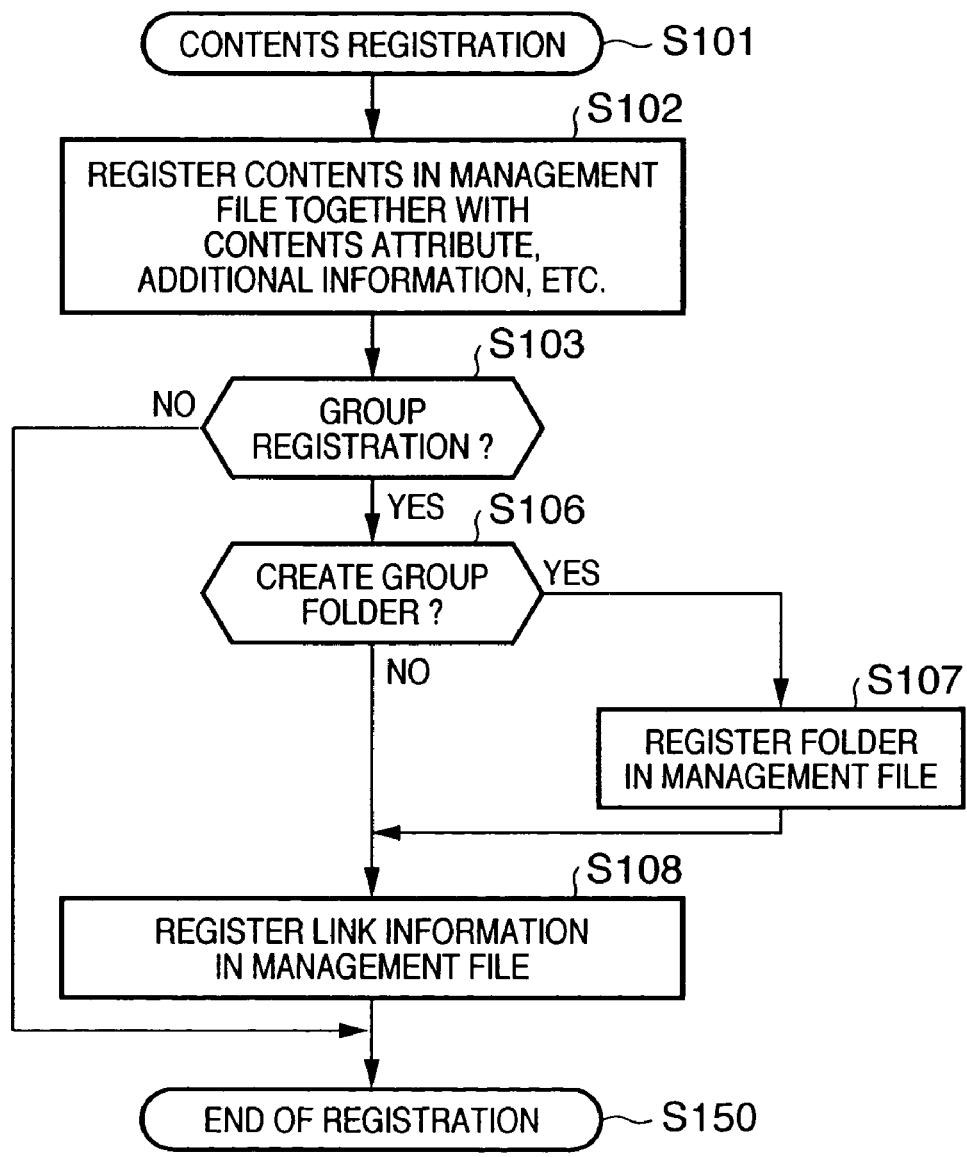
FIG. 11 is a flowchart for explaining a processing operation in the image sensing apparatus according to the embodiment of the present invention.

FIG. 11 is a flowchart for explaining an operation for recording contents and registering the contents in the contents management file "mgri001.inf".

Figure 12:
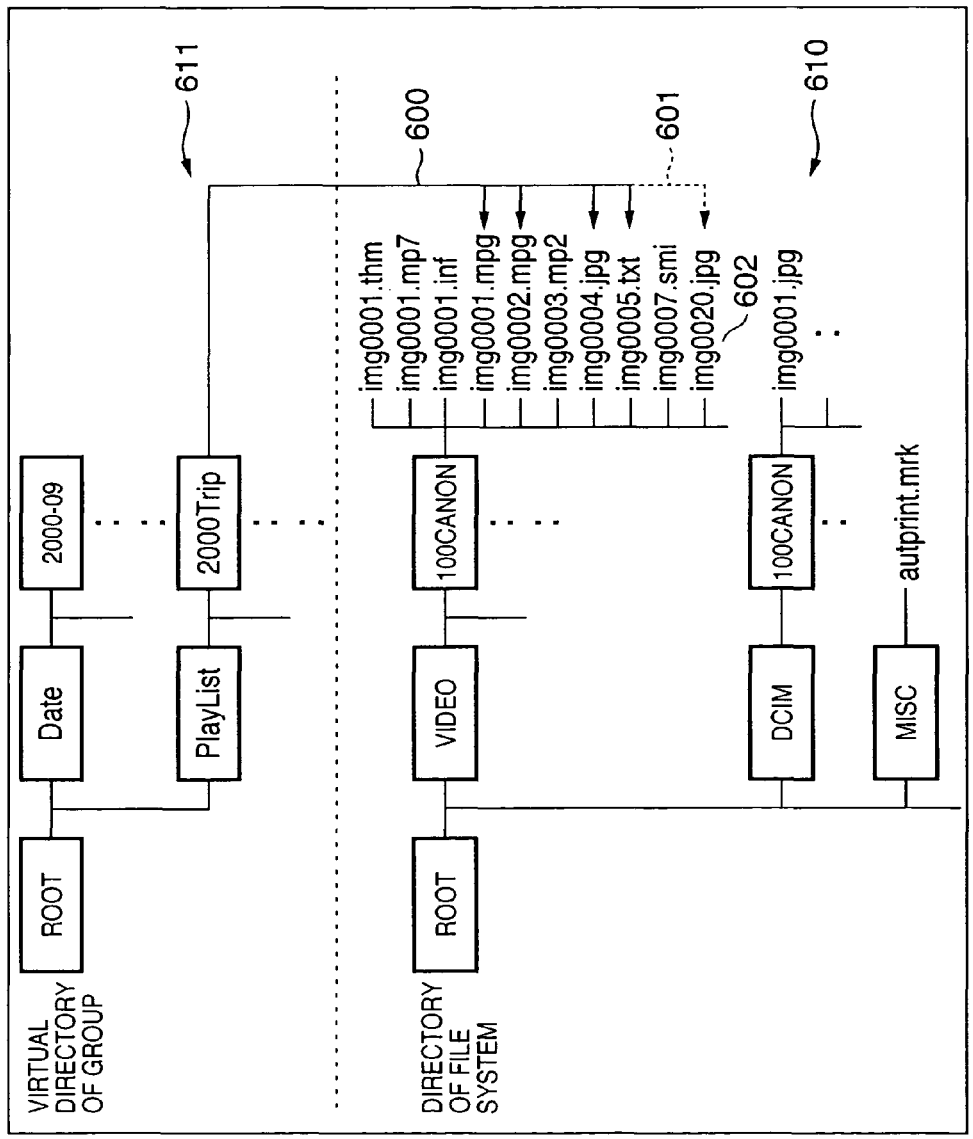
FIG. 12 depicts a view for explaining a manipulation example of the directory structure according to the embodiment of the present invention.

FIG. 12 depicts a view for explaining a process for adding an image file "img0020.mpg" to the configuration shown in FIG. 6.

A case will be explained below with reference to FIGS. 12 and 11 wherein the recorded contents are MPEG2 contents having a file name "img0020.mpg" (602 in FIG. 12), and that contents file is additionally registered in the contents management file.

If the file "img0020.mpg" (contents) 602 is registered in the file system 610, a registration process of the contents to the management file starts in step S101. In step S102, the recorded image file "img0020.mpg" 602 is registered in the contents management file "mgri001.inf" together with its attribute and additional information. More specifically, an empty or new index region #N of the contents management file "mgri001.inf" in FIG. 7 is acquired. A representative image of the created image file "img0020.mpg" 602 is recorded and registered in "img0001.thm", and its index number #TN is acquired. The additional information (date, name, creator, apparatus information, photographing information, environment information, and the like) of the image file "img0020.mpg" 602 is recorded and registered in "img0001.mp7" described above, and its index number #XN is acquired.

The index information structure shown in FIG. 8 describes "attribute" 801=0x02 (MPEG2), "index number" 802=#N, "extended index of additional information" 803=#XN, "thumbnail index number" 804=#TN, and additional information 806 and other information 807 (as needed), and is registered in "index #N" of "mgri001.inf" in FIG. 7. If the file has a plurality of thumbnails, they are recorded and registered in "img0001.mp7", and their index numbers=#TN1, #TN2, . . . , #TNN are described in "thumbnail index number" 804 together with information such as the thumbnail positions, display priority order, and the like.

The flow then advances to step S103 to check if the contents file is to be registered in a group folder. If the contents file need not be registered in a group folder, the flow jumps to step S150 to end the registration process. If the contents file must be registered in a group folder, the flow advances to step S106 to check if a new group folder is to be created. If a new group folder must be created, the flow advances to step S107 to create a new group folder.

More specifically, an empty or new index region #G of the contents management file "mgri001.inf" in FIG. 7 is acquired. A prepared representative image is recorded and registered in "img0001.thm", and its index number #TG is acquired. The additional information (date, name, creator, folder additional information, and the like) is recorded and registered in "img0001.mp7" as needed, and its index number #XG is acquired. The index of the group folder shown in FIG. 10 describes "attribute" 1001=0x80 (group folder), "index number" 1002=#G, "index number of parent directory"

1003="0x01" (if a parent directory is the directory "ROOT"), "thumbnail index number" 1004=#TG, "folder name" 1006, "extended index of additional information" 1007=#XG, and the like, and is registered as "index #G" of the contents management file "mgri001.inf".

If the contents file is to be added to the existing folder in place of a new folder or after execution of step S107, the flow advances to step S108 to register a member in the group folder. More specifically, the index of the contents to be added is registered in member N of the new or existing group index. Then, the number of members (N) is incremented by 1. Also, additional information and the like are corrected as needed. The registered state is indicated by a broken line 601 in FIG. 12. The registration process ends in step S150.

The operation and display example in a playlist confirmation mode of the image sensing apparatus 200 will be explained below.

Figure 13:
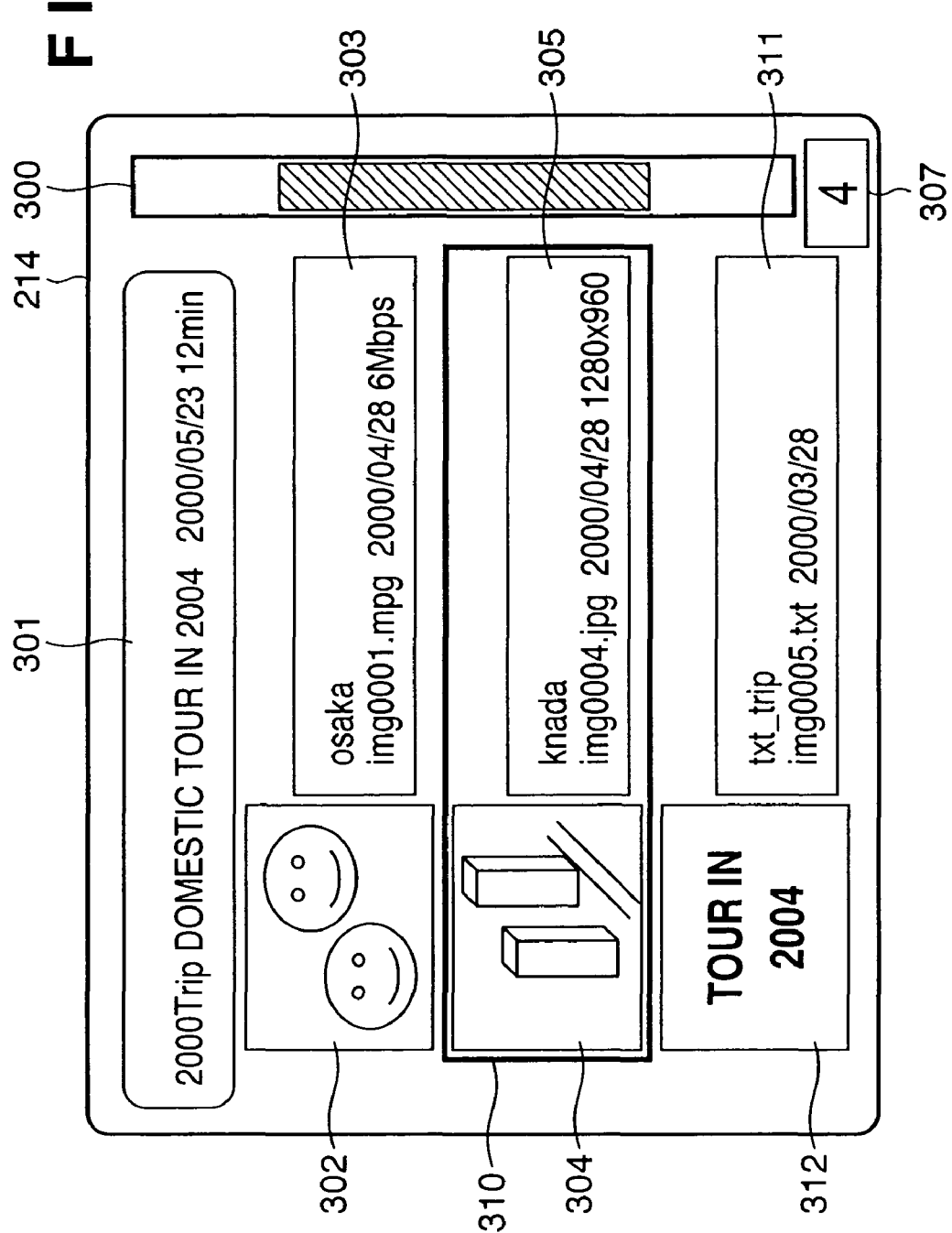
FIG. 13 depicts a display example on a display screen of the image sensing apparatus according to the embodiment of the present invention.

FIG. 13 shows a display example upon displaying a list of members of the selected playlist on the display 214 in the image sensing apparatus 200 according to this embodiment.

Referring to FIG. 13, reference numeral 300 denotes a slide bar; numeral 301 denotes a comment area of additional information of a playlist; numeral 310 denotes a selection cursor; numeral 302 denotes a representative image display of the use contents file of a playlist "2000Trip"; numeral 303 denotes a use contents additional information display area; and numeral 307 denotes a display area of the number of use contents.

The image sensing apparatus 200 reads out the contents management file "mgri001.inf" and the like from the recording medium 250 onto its internal memory 222, and stores (caches) necessary information. In this display example, the group of the selected playlist is referred to from the index of the group folder of "mgri001.inf". The number of contents (N) is acquired based on the number of members (N) 1007 in that group index to set the slide bar 300 and to display the number of use contents (307) (in the example of FIGS. 6 and 13, N=4). Contents are acquired as members 1 to N (index numbers), and the index numbers of contents files are acquired from these index numbers. Also, the thumbnail index numbers are acquired from these indices to display thumbnails (302). Also, the index number of meta data is acquired from this index to display additional information of the contents files (303).

The example of FIG. 13 will be explained below. The thumbnail 302 indicates a representative image of an image file "img0001.mpg", and a thumbnail 304 indicates a representative image of an image file "img0004.jpg". Reference numeral 305 denotes additional information of the image file "img0004.jpg". Reference numeral 311 denotes additional information of a text file "img0005.txt"; and 312, a representative image of the text file "img0005.txt".

Figure 14:
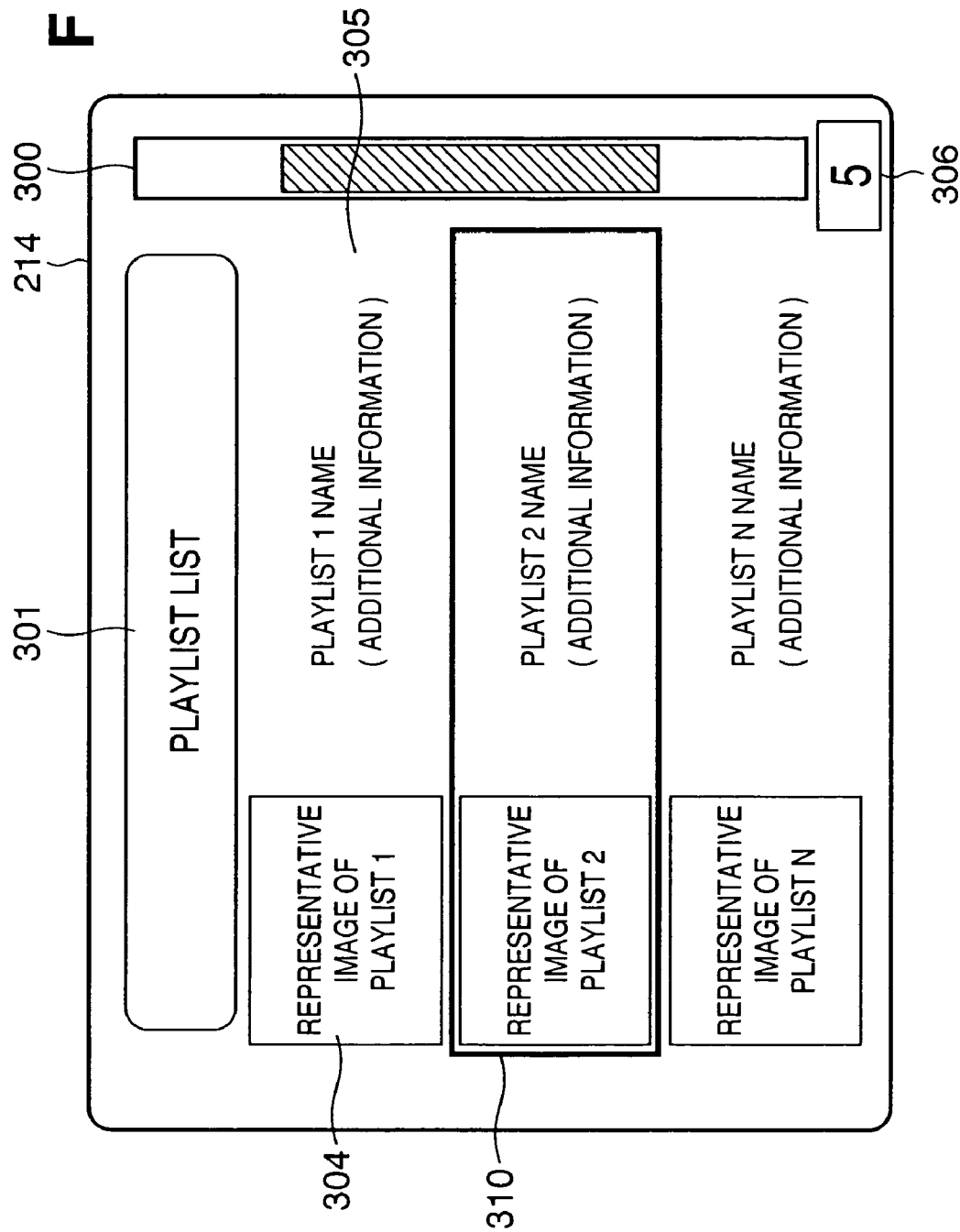
FIG. 14 depicts an example of playlists displayed on a display unit of the image sensing apparatus according to the embodiment of the present invention.

FIG. 14 depicts the image configuration of a list of playlists displayed on the display 214 of the image sensing apparatus 200 of this embodiment.

Referring to FIG. 14, reference numeral 300 denotes a slide bar; numeral 301 denotes a display title; numeral 310 denotes a selection cursor; numeral 304 denotes a representative image display of playlist 1; and numeral 305 denotes an additional information display area of playlist 1. In this display example, the groups of the selected playlists are extracted from the index of the group folder of "mgri001.inf". Based on the number of group indices ("5" in this case), the slide bar 300 is set (to set its length or the like), and the number of playlists (306) is displayed. Also, the index number of meta data is acquired from this index, and contents file additional information is displayed.

Figure 15:
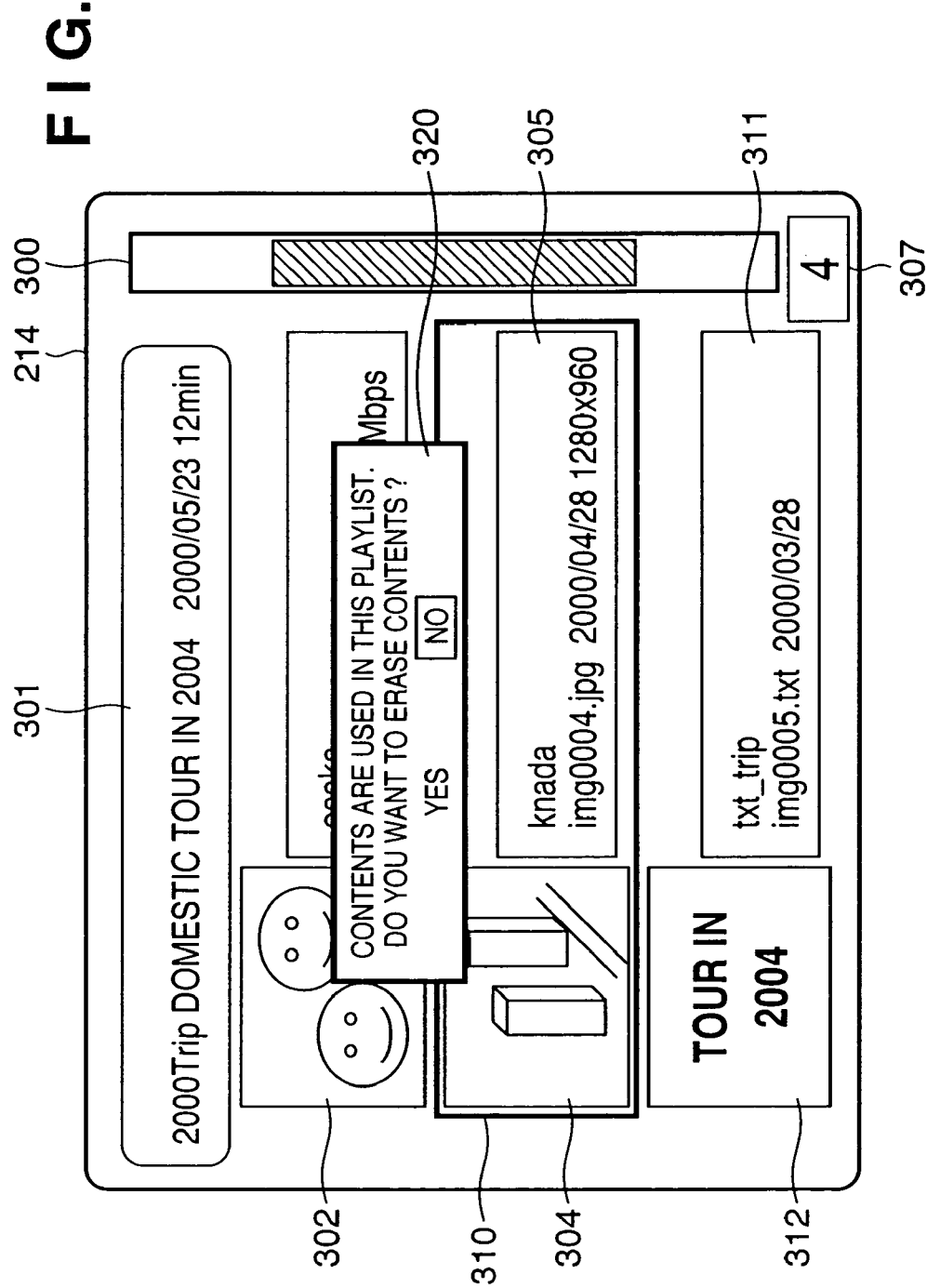
FIG. 15 depicts a display example on the display screen of the image sensing apparatus according to the embodiment of the present invention.

FIG. 15 depicts a display example upon editing or erasing a contents file of the playlist displayed on the display 214, as shown in FIG. 13. The same reference numerals in FIG. 15 denote parts common to those in FIG. 13.

When a contents file recorded on the recording medium 250 is to be edited or erased by a contents file edit operation, an edit operation from an external apparatus, or the like, if that contents file is used in a given playlist, it is important to ask for the operator if that edit/delete operation is to be proceeded. In this case, when the contents file to be edited/deleted is a member of a given group folder, the contents files used in the method of the display and operation example shown in FIG. 13 are displayed, and a confirmation dialog 320 in FIG. 15 is displayed. This confirmation dialog 320 displays a message "Contents are used in this playlist. Do you want to proceed to edit or erase contents?" and selection boxes "yes" and "no". Therefore, whether or not this contents file is to be erased/deleted is selected according to the selection result of the selection boxes.

In this embodiment, the virtual directory of the group is created, and a contents file is registered as a member with reference to its index. Alternatively, a virtual directory of a contents file may be created, and the index of the contents file registered in the virtual directory of the contents file may be referred to from the virtual directory of the group to register that file.

As described above, since the contents management file "mgri001.inf" as a file used to simultaneously manage required contents file and a group is assured, an application can handle a large number of files via this contents management file and can generally and quickly execute required processes such as grouping without using the file system. For example, a plurality of contents files included in a group can be easily and quickly displayed, or a representative image of a group can be easily and quickly displayed.

The application can acquire required contents files without interpreting a playlist file.

As a result, even for a playlist file that repetitively refers to an identical contents file, a reference file list can be displayed in a short response time.

In a system accessed from a plurality of apparatuses (e.g., an apparatus such as a personal computer, or an apparatus which is connected to and can be controlled by another apparatus such as a personal computer) and applications, reference contents files can undergo an exclusive process in advance, and can be protected in advance from other applications.

Even an apparatus which does not have any playlist function can detect contents files which are referred to and designated by a playlist file, and can execute appropriate processes such as list display of reference files, generation of a warning upon erasure, and the like. Especially, in a consumer video camera or the like, a highly value-added function which is not available in conventional video cameras can be provided.

According to this embodiment, contents files used in a playlist can be easily and quickly displayed and retrieved.

Other Embodiments

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiment, and various changes and modifications can be made thereto within the spirit and scope of the present invention. Therefore, to apprise the public of the scope of the present invention, the following claims are made.

The invention claimed is:

1. A camera comprising:
   a recording medium compartment for receiving a removable recording medium;
   an image sensing unit configured to sense an image to obtain image data of the image;
   a recording and playback unit configured to record an image file including the image data obtained by the image sensing unit in the recording medium in accordance with a recording instruction, and to read out the image file from the recording medium;
   a management file processing unit configured to generate a content management file for playing back a plurality of image files recorded in the recording medium in accordance with the recording instruction, wherein the content management file includes a plurality of information blocks, each information block respectively corresponding to one of the plurality of image files recorded in the recording medium, and each information block including a respective block number corresponding to the corresponding one of the plurality of image files and the respective name of the corresponding one of the plurality of image files;
   a playlist generation unit configured to generate a playlist file indicating a playback sequence of a designated plurality of image files recorded in the recording medium in accordance with a playlist generating instruction, wherein the management file processing unit adds a new information block for the playlist file to the content management file, in accordance with the playlist generating instruction; and
   a detection unit constructed to detect a name of each of the plurality of image files designated by the playlist file in accordance with the information block corresponding to the playlist file included in the content management file, without interpreting the playlist file,
   wherein the recording and playback unit records the playlist file in the recording medium where the image files are stored, and
   wherein the newly added information block for the playlist file includes a block number of the information block corresponding to the playlist file and respective block numbers of the information blocks corresponding to the plurality of image files designated by the playlist file.

2. The camera according to claim 1, wherein the detection unit further detects the block numbers of the information blocks corresponding to the plurality of image files designated by the playlist file included in the information block for the playlist file of the content management file; and wherein the camera further comprises:
   a display unit configured to obtain the information blocks corresponding to the plurality of image files designated by the playlist file from among the plurality of information blocks included in the content management file in accordance with the block numbers detected by the detection unit, and to display a list representing the names of the plurality of image files designated by the playlist file in accordance with the names of the plurality of image files detected by the detection unit.

3. The camera according to claim 1, wherein the recording and playback unit records the content management file on the recording medium where the plurality of image files and the playlist file are recorded.

4. A control method for a camera, the method comprising:
   using a processor of the camera to perform an image sensing step of sensing an image to obtain image data of the image;
   using the processor of the camera to perform a recording and playback step of recording an image file including the image data obtained in the image sensing step in a recording medium in accordance with a recording instruction, and reading out the image file from the recording medium;
   using the processor of the camera to perform a management file processing step of generating a content management file for playing back a plurality of image files recorded in the recording medium in accordance with the recording instruction, wherein the content management file includes a plurality of information blocks, each information block respectively corresponding to one of the plurality of image files recorded in the recording medium, and each information block including a respective block number corresponding to the corresponding one of the plurality of image files and the respective name of the corresponding one of the plurality of image files;
   using the processor of the camera to perform a playlist generation step of generating a playlist file indicating a playback sequence of a designated plurality of image files recorded in the recording medium in accordance with a playlist generating instruction, wherein in the management file processing step, a new information block for the playlist file is added to the content management file, in accordance with the playlist generating instruction;
   using the processor of the camera to perform a detection step of detecting a name of each of the plurality of image files designated by the playlist file in accordance with the information blocks corresponding to the playlist file included in the content management file, without interpreting the playlist file;
   using the processor of the camera to perform a recording step of recording an image file including the image data and the playlist file generated in the playlist generation step, onto the recording medium; and
   using a processor of the camera to perform a playback step of playing back the image file and the playlist file from the recording medium, wherein in the management file processing step, a new information block for the playlist file is added to the content management file, in accordance with the playlist generating instruction, and wherein the newly added information block for the playlist file includes a block number of the information block corresponding to the playlist file and respective block numbers of the information blocks corresponding to the plurality of image files designated by the playlist file.

5. A camera comprising:

an image sensing unit configured to sense an image to obtain image data of the image;

and a computer-readable memory storing computer-executable process steps; and a processor constructed to execute the computer-executable process steps stored in the memory, wherein the process steps stored in the memory cause the processor to manage image files, and include computer-executable process steps to:

record an image file including the image data obtained by the image sensing unit in a recording medium in accordance with a recording instruction, and read out the image file from the recording medium;

generate a content management file for playing back a plurality of image files recorded in the recording medium in accordance with the recording instruction, wherein the content management file includes a plurality of information blocks, each information block respectively corresponding to one of the plurality of image files recorded in the recording medium, and each information block including a block number corresponding to the corresponding one of the plurality of image files and a name of the corresponding one of the plurality of image files;

generate a playlist file indicating a playback sequence of a designated plurality of image files recorded in the recording medium in accordance with a playlist generating instruction, wherein a new information block for the playlist file is added to the content management file, in accordance with the playlist generating instruction; and detect a name of each of the plurality of image files designated by the playlist file in accordance with the information block corresponding to the playlist file included in the content management file, without interpreting the playlist file, wherein the playlist file is recorded in the recording medium where the image files are stored, and wherein the newly added information block for the playlist file includes the block number of the information block corresponding to the playlist file and respective block numbers of the information blocks corresponding to the plurality of image files designated by the playlist file.

* * * * *